United States Patent [19]

Rickert et al.

[11] Patent Number: 4,502,136
[45] Date of Patent: Feb. 26, 1985

[54] APPARATUS FOR CENTERING AND CLAMPING AN INFORMATION RECORDING DISK IN A DATA STORAGE DEVICE

[75] Inventors: David W. Rickert; Richard A. Wilkinson, Jr., both of Boulder; William C. Hunt, Lafayette, all of Colo.

[73] Assignee: Storage Technology Partners II, Louisville, Colo.

[21] Appl. No.: 481,963

[22] Filed: Apr. 4, 1983

[51] Int. Cl.³ .......................... G11B 9/06; G11B 19/20
[52] U.S. Cl. ..................................... 369/271; 369/264; 369/77.2
[58] Field of Search .................... 369/270, 271, 75.1, 369/77.1, 77.2, 194, 264

[56] References Cited

U.S. PATENT DOCUMENTS

| 4,232,870 | 11/1980 | Iemenschot | 369/270 |
| 4,351,047 | 9/1982 | Redlich et al. | 369/270 |
| 4,387,454 | 6/1983 | Yamamura et al. | 369/270 |

FOREIGN PATENT DOCUMENTS

| 2909099 | 9/1980 | Fed. Rep. of Germany | 369/271 |
| 71687 | 2/1953 | Netherlands | 369/270 |

*Primary Examiner*—Steven L. Stephan
*Attorney, Agent, or Firm*—Ronald C. Williams

[57] ABSTRACT

The centering and clamping device consisting: a disk elevator, a disk support, a disk centering assembly, a disk clamping assembly, and a disk rotating assembly. In operation the disk is raised out of the disk insert tray cartridge by the disk elevating means and raised upward to engage a taper on the spindle of the device spin motor, moving upward until the cooperation between the taper on the neck spindle and the tapering on the disk centering collar cause the disk to move laterally until precisely centered on the spindle. Thereafter, the continued upward movement on the disk on the elevator lifting assembly causes a magnet located on the disk support means to come into magnetic contact with a steel plate on the spindle platform, thereby securely clamping the disk to the spindle for rotation. Thereafter, the elevator moved downward and clamping the disk from disk support means, thereby allowing the free rotation of the spindle disk and disk support assembly relative to a stationary elevating means. For removal, the above described procedure is reversed with the elevator moving slightly upward clamping into the disk support assembly, thereby the entire assembly moving downward removing the disk from the spindle the column moving further downward until the disk rests securely in a cartridge for removal from the device.

4 Claims, 5 Drawing Figures

APPARATUS FOR CENTERING AND CLAMPING AN INFORMATION RECORDING DISK IN A DATA STORAGE DEVICE

BACKGROUND OF THE INVENTION

The present invention, an apparatus for automatically centering and clamping a rotatable information recording disk in a data storage device, relates to the field of information storage device disk-handling systems, and in particular to systems for automatically centering and securing said disks in data storage devices having removable disk capabilities.

Rotating disk storage systems can be divided into two broad categories, those which have user-replaceable information disks and those which have permanently mounted disks. One of the advantages of a replaceable disk system is that the disks of a given system are compatible and therefore usable in all the disk units in that system. That is, not only can the disk be installed and removed any number of times on a given disk system, it can also have data recorded on it while installed in one system and be removed and installed in a different system where the data can be read. When a replaceable disk is mounted on the spindle, it is essential that the disk be accurately centered on the axis of rotation of the spindle in order to prevent read and write errors.

In modern magnetic and optical data storage systems, it is desirable for the customer to be able to remove a given disk from the system and insert a new disk to be read or written upon. Because of the relatively minute distance between tracks on both magnetic and optical disks, precise centering of the newly inserted disk is desirable. In particular, because the separation between tracks on optical disks is in the order of a few microns, proper centering of the disk on the spindle of the optical data storage device is especially critical. In the prior art, a wide variety of means are known for mounting and securing removable disks. Optical recording devices require even more accurate centering of the disk than in prior art devices because of the smaller spacing between optical data tracks. One basic requirement of securely fixing the disk to the spindle in order that the disk remain securely fastened to the spindle during the rapid rotation of the disk during operation. The disk may also stay severely fastened to the spindle if an unusual power interruption occurs. In the prior art, the features which provide for attachment of the disk to the spindle during operation, have caused a loss of centering accurately due to the high friction between disk and spindle during the centering process. The present invention addresses these problems by providing a means for accurately centering the disk on the spindle prior to clamping, and only when accurate centering has been achieved, then securely fixing the disk to the spindle for rotation.

Another problem with the prior art is that even though the disk is rigid, the unsupported portion of the disk will "flutter", or "wobble", as a result of the resonances and vibrations causes by the moving mechanical assembly and of the air currents produced by the rotation. This wobble causes the surface of the disk to move toward and away from the magnetic heads or optical lens, increasing and decreasing the strength of the signals recorded or read in a magnetic recording and causing defocusing of the radiation beam in optical recording.

The disclosed invention is also an improvement over the prior art in that a relatively simple centering and clamping apparatus is disclosed.

It is an object of this invention to provide a means for the accurate centering of a disk to a spindle in a data storage device.

It is a further object of the disclosed invention to provide a means for the accurate repeatable centering of a disk on a spindle in a data storage device.

It is still a further object of the disclosed invention to provide a means for securely and safely clamping a disk to a spindle in a data storage device.

It is still yet a further object of the disclosed invention to provide a means for relatively simply securing and clamping a disk to a spindle in a data storage device.

SUMMARY OF THE INVENTION

In the preferred embodiment of the disclosed invention, the centering and clamping device consists of; a disk elevating and lowering means, a disk support means, a disk centering means, a disk clamping means, and a disk rotating means. The storage disk is disposed in a disk insert tray, said insert tray retaining the disk by its lower outer edge, thereby allowing the disk to be unseated and completely lifted out of the top of the cartridge. In operation, the disk to be loaded, is inserted into the data storage device by any conventional means, whether automatic or manual. When loaded into the device, the disk and disk cartridge are located with the center axis of the disk generally coincident with the center axis of the disk rotating means, and deposed between the disk rotating means and the disk supporting means. Once loaded, the disk lifting means is activated, which in the preferred embodiment is referred to as an elevator assembly. The elevator assembly raises the disk support means, into contact with the disk, raising the disk out of the cartridge and up toward the device spindle. Located upon the disk spindle are the receiving portions of the device centering means and part of the disk clamping means.

In the preferred embodiment, the disk centering means is comprised of; a downward projecting device spindle neck having an exterior taper and an interior passage in said neck; a centering stem located on the center of the disk support means, said centering stem being insertable into the interior neck passage and of the device spindle causing the disk support means to center under the device spindle, and; a tapered centering collar, located on the disk, said tapered centering collar engaging the outer neck taper, thereby causing the disk to be precisely centered on the spindle. The disk centering means causes the disk support means to be moved laterally and thereby centered under the device spindle. Continued elevation of the disk support means causes the disk to be laterally moved relative to the device spindle and the disk support means as need be to precisely center the disk on the device spindle. Once precise centering has been achieved, the lifting means continue to lift the disk upward, a small amount allowing the clamping means, in the preferred embodiment comprising a magnet ring and a circular steel armature to be activated, causing a magnet ring located on the support means to make magnetic connection with the steel armature on the spindle, thereby clamping the disk to the spindle between the magnet on the disk support means and the steel armature on the spindle.

Once clamped, the disk support means retaining fingers are released upward and simultaneously, the lifting means is moved slightly downward causing the lifting means to separate slightly from the support means. With the release of the support means from the elevating means, the disk and the support means are free to rotate with the spindle, while the elevator means remain stationary.

To remove a disk, the reverse procedure is followed. First the elevator means moves upward contacting the lifting means with the support means. The retaining fingers are then activated downward, clamping the disk support means to the elevator means. The elevator means then moves downward, pulling the disk support means, and thereby the disk, away from the spindle. The elevator means continues to move downward until the outer edge of the disk contacts the inner lip of the cartridge insert tray. The disk is then thereby seated in the disk cartridge for removal from the device.

DETAILED DESCRIPTION OF THE PREFERRED EMBODIMENT

Figure 1:
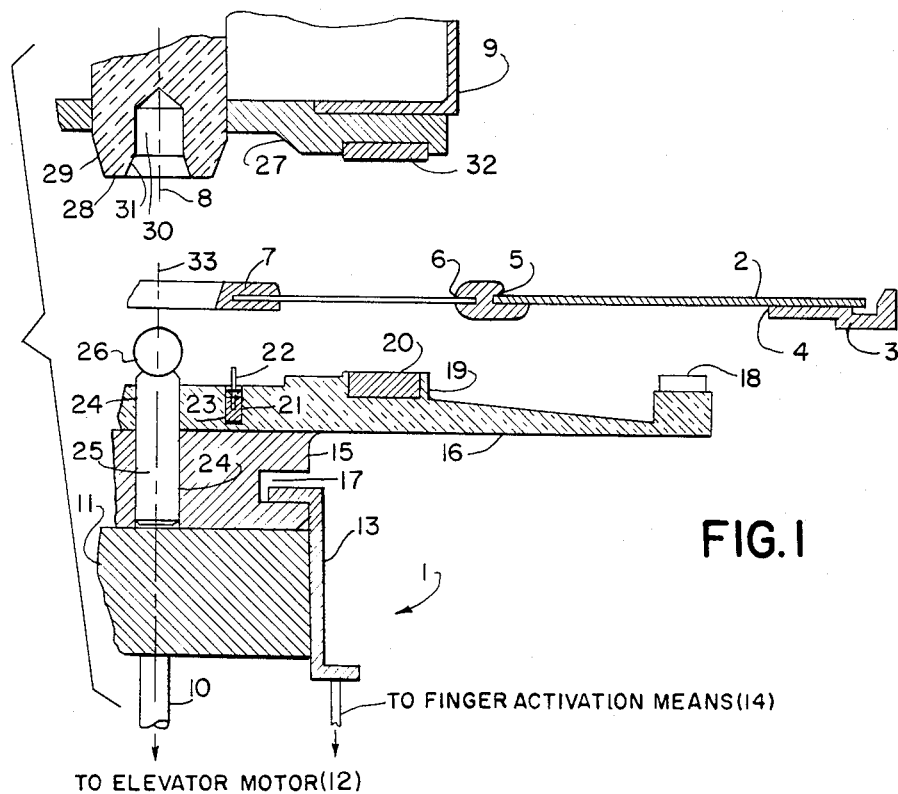
FIG. 1 is a cross section representation of the preferred embodiment of the disclosed invention, showing the disk and the disk cartridge inserted into the device between the fully retracted disk support and disk elevator means below said disk, and the spindle and disk rotating means located above said disk.

In FIG. 1, the disclosed invention, an apparatus 1 for centering and clamping an information disk, is shown with the disk 2 disposed in its cartridge insert tray 3 and loaded in the device. The cartridge insert tray 3 is configured such that the disk 2 is retained in the cartridge 3 only along the outer edge 4, thus allowing the disk 2 to be lifted upward out of the cartridge 3 for loading. The disk 2 has attached to its inner edge 5, a flexible spacer ring 6. The inner edge of the spacer ring is attached to the centering collar 7. When loaded into the device, the center line 33 of the disk 2, is generally coincident with the center line 8 of the device spindle 9.

As shown in FIG. 1, the portion of the apparatus 1, located below the disk 2 and cartridge 3, is connecting shaft 10 the upper end of which is connected to the elevator head 11. The lower end of the connecting shaft 10 is connected to the elevator motor 12 (not shown). Disposed around the elevator head 11 are a plurality hub of retaining fingers 13 the lower ends of which are connected to retaining finger activation means 14 (not shown) which cause the retaining fingers 13 to move in an upward or downward motion relative to the elevator head 11.

Resting on the elevator head 11 is the support hub 15 which is securely attached to and supports the disk support platter 16. The support hub 15 has a horizontal annular recess 17 around it's circumference into which the retaining fingers 13 are inserted. The disk support platter 16 has a raised outer rim 18, an inner raised rim 19 of which an integral part thereof is a tubular shaped magnet ring 20. The disc support platter 16 also has a plurality of holes 21, equally spaced on the disk support platter 16 upper surface, in which a plurality of plunger 22 and a plunger spring 23 assemblies, are mounted. The plunger spring 23 causes the plunger 22 to be located in a position above the plane of the disk support platter 16 upper surface. The disk support platter 16 and the hub 15 have an inner hole 24 for the mounting of a centering stem 25, said stem 25 having a ball-shaped 26 upper end, with the lower end securely fixed in the hole 24 for that purpose in the platter 16 and hub support 15.

As shown in FIG. 1, located above the disk 2 and cartridge 3 when inserted into the device, is the device spindle 9, having a bottom oriented surface 27, a downward projecting spindle neck 28, said spindle neck 28 having an outer neck taper 29, and an interior neck passage 30, said passage 30 also having an interior passage taper 31. The device spindle 9 is attached to a spin motor (not shown).

Figure 2:
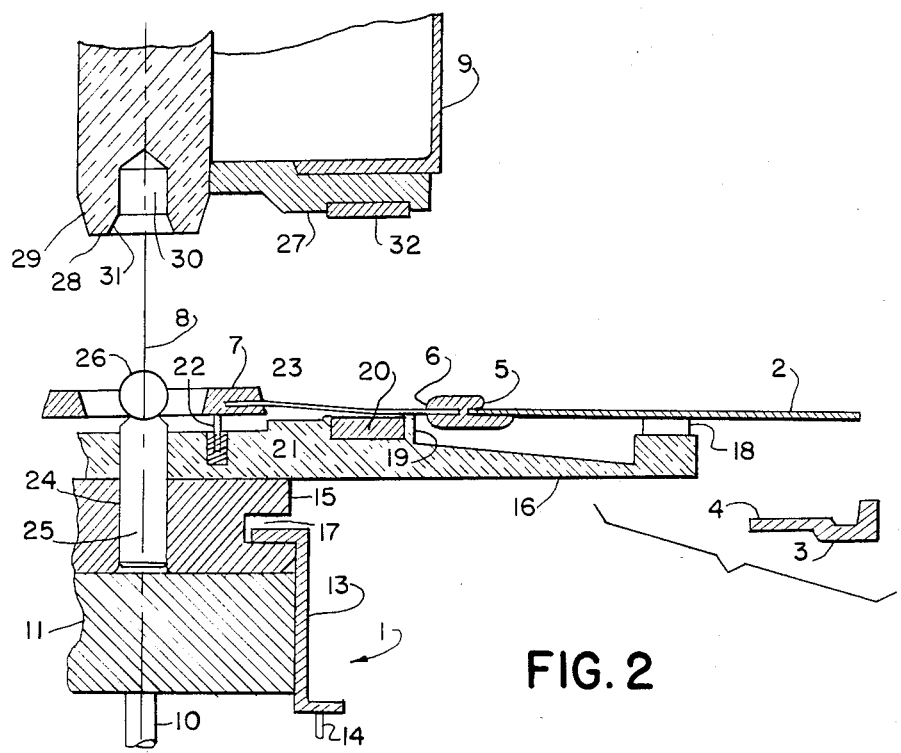
FIG. 2 is a cross section representation of the preferred embodiment showing the partially elevated elevator and disk support means, with a plunger assembly having caused a flexible ring to flex upward, raising a centering collar above the plane of the disk.

In operation, as shown in FIG. 1, the disk 2 and cartridge 3 are inserted into the apparatus, such that the center line 33 of the axis of the disk 2 is generally coincident with the center line 8 through the device spindle 9. Once loaded, the elevator motor 12 (not shown) is activated. As shown in FIG. 2, the elevator motor 12 (not shown) causes the elevator connecting shaft 10, the elevator head 11, the retaining fingers 13, the support hub 15, and the disk support platter 16, to move in an upward direction, lifting the disk 2 out of the cartridge 3, said disk 2. As shown in FIG. 2, the centering collar 7 is first raised above the plane of the disk 2, by the plunger assemblies 21, said upward relative motion allowed by the bending of the flexible space ring 6. As shown in FIG. 2, the retaining fingers 13 are in a downward position thereby securely holding the hub 15 to the elevator head 11.

Figure 3:
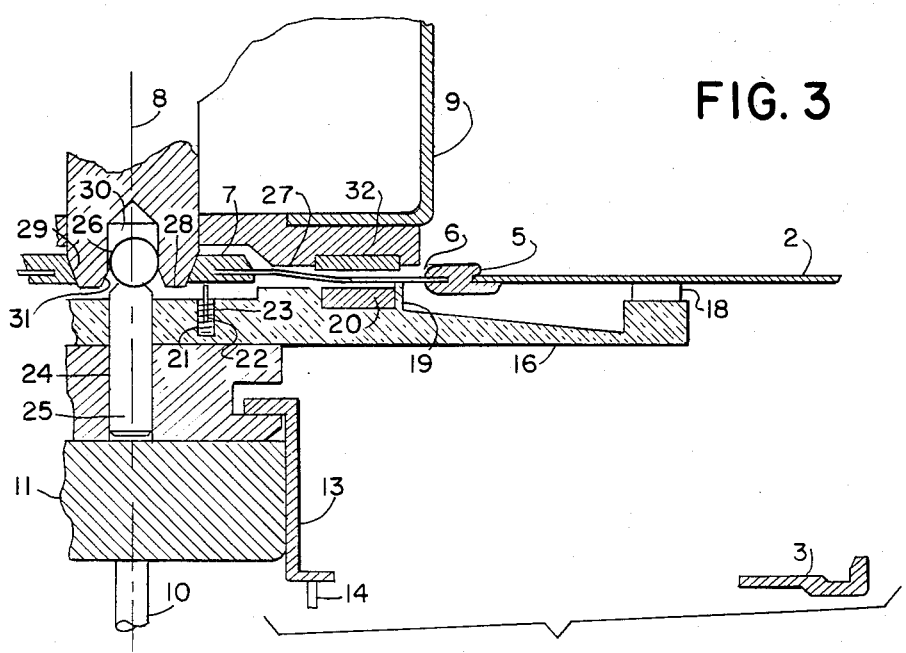
FIG. 3 is a cross section representation of the preferred embodiment showing the elevator assembly fully raised with the disk centering assembly having generally centered the disk support means by insertion of a centering stem into a neck passage in the spindle, with the disk support means platter still retained on the elevator assembly by a set of retaining fingers.

As shown in FIG. 3, as the entire assembly continues upward, the ball-shaped 26 upper end of the centering stem 25 contacts the inner taper 31 of the neck 28, causing the disk support platter 16 and support hub 15 to move laterally as need be to center the disk support 16 and support hub 15 relative to the spindle neck 28. As the elevator assembly continues upward, the centering stem 25 passes into the spindle passage 30, centering the support platter 16 and support hub 15. As the elevator assembly continues upward, as shown in FIG. 4, the centering collar 7 also contacts the outer taper 29 on the spindle neck 28, causing the disk 2 to move laterally relative to the disk support platter 16 precisely centering the disk 2 on the spindle neck 28 and device spindle 9.

Figure 4:
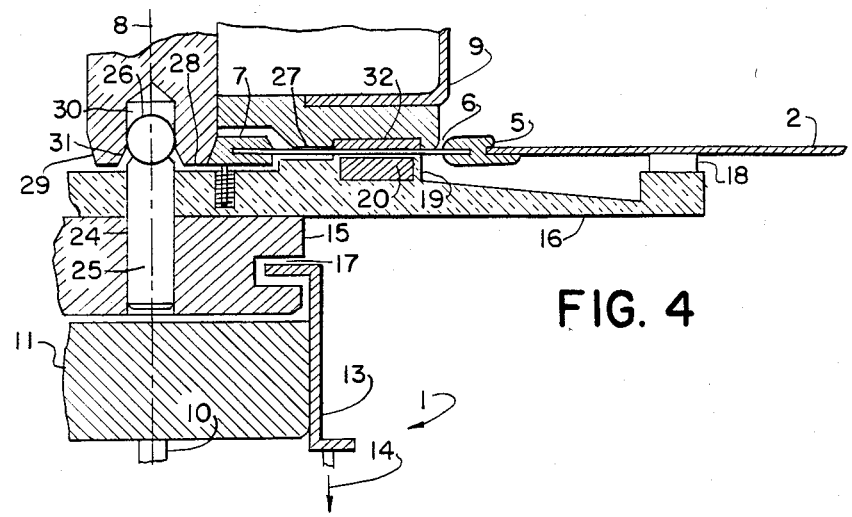
FIG. 4 is a cross section representation and of the preferred embodiment with the retaining fingers released showing the disk support means fully seated on the spindle by magnetic clamping, with the disk firmly secured to the spindle between the magnet and a steel pad located on the spindle surface.

As shown in FIG. 4, as the elevator assembly continues upward, the plane of the disk 2 becomes coincident with the plane of the centering collar 7 and flexible spacer ring 6. As shown in FIG. 4, the lower surface of the spindle 9 has deposed therein a circular steel armature 32 which is directly above the magnet ring 20 in the inner rim 19 of the platter surface. As the elevator assembly continues upward, the magnetic force between the magnet 20 and the steel armature 32, causes the secure clamping of the flexible ring 6 and thereby the disk 2, to the spindle 9, the disk 2 firmly supported by the outer rim 18 of the disk support platter 16 as shown in FIG. 1.

Also, as shown in FIG. 4, once the disk 2 is securely clamped to the device spindle 9, the finger retaining means 14 is activated, moving the retaining finger 13 slightly upward releasing the hub 15 from the head 11. Thereafter, the elevator assembly moves slightly downward the elevator head 11 away from the support hub 15 which is now securely clamped to the spindle 9 along with the disk support platter 16 and disk 2. At this point, the spin motor (not shown) on the device can be activated causing the device spindle 9, the disk 2, the disk support platter 16, and the support hub 15 to all freely spin relative to the stationary head 11, elevator shaft 11, and elevator motor 12.

For removal of the disk 2, the above procedure is reversed with the elevator motor 12 causing upward movement so as to allow the elevator head 11 to firmly support the support hub 15, the finger retaining activation means 14 is activated moving downward securing the hub 15 to the elevator head 11, the elevator motor 12 is then activated causing the disk support platter 16 to pull away from the spindle 9, said disk 2 also moving downward, this operation continuing until the disk 2 comes to rest in the cartridge 3. The elevator motor continues to cause downward movement of the disk support platter 16, out of the plane of the disk 2. Thereafter, the cartridge 3 and disk 2 can be removed from the device.

Figure 5:
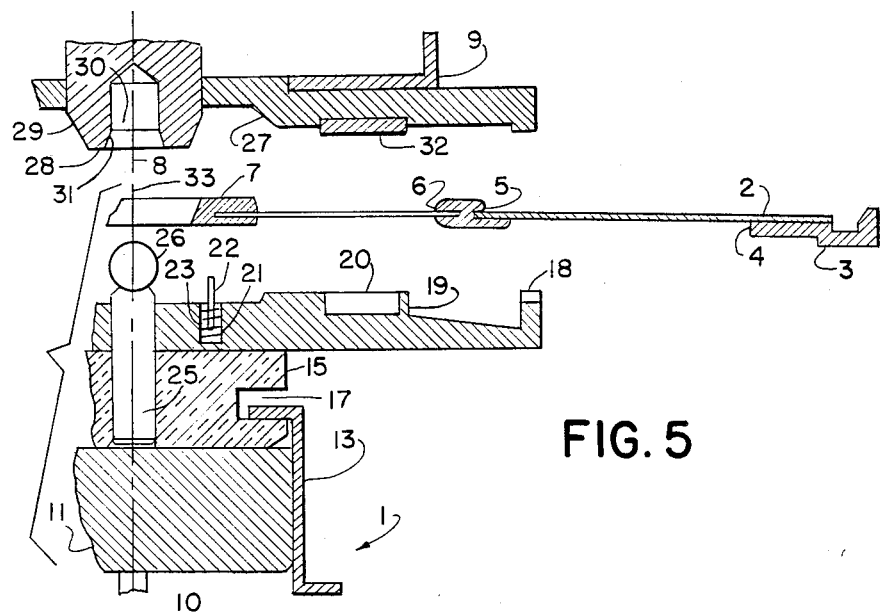
FIG. 5 is a cross section representation of an alternate embodiment which allows both sides of the disk to be used for data storage.

FIG. 5 shows an alternative embodiment of the enclosed invention wherein the disk support platter 16 has a relatively shorter radius such that the raised outer rim 18 supports the disk 2 on the inner diameter of said disk 2 such that a data sensing means, not shown, may have access to both the upper and the lower surface of said disk 2.

We claim:

1. An apparatus for the accurate centering and clamping of an information recording disk in an information recording device, comprising:
   an information recording disk;
   a disk support assembly, said disk support assembly having,
      a disk support hub, said disk support hub having a means for receiving a first disk support assembly clamping means, and
      a disk support platter, said disk support platter attached to the disk support hub, said disk support platter having a first, raised circular rim located upon the upper outer surface of said disk support platter and supporting the middle portion of the disk, further having a second, raised circular rim located upon the upper inner surface of the disk support platter and supporting the inner portion of the disk, further having a disk centering means;
   a disk rotating means, said disk rotating means having a rotating spindle, said spindle having a bottom facing surface for the mounting of the disk, said bottom surface having a downward projecting neck, said neck having a tapered outer surface to accept an inner taper of a centering collar of the disk, and said spindle neck further having a cylindrical passage, said passage having a tapered lower rim to closely accept a centering stem of a disk centering assembly;
   a disk elevator assembly, said disk elevator assembly raising the disk and the disk support assembly until the disk is centered and clamped onto the disk rotating means, said disk elevator assembly thereafter retracting so as to disengage from the disk support assembly, thereby allowing free rotation of the disk and the disk support assembly with the disk rotating means, the disk elevator assembly remaining stationary;
   a disk centering assembly, said assembly having
      a centering stem, said centering stem having a ball-shaped upper portion and wherein the lower portion of the centering stem is closely seated in a first opening in the disk support platter and disk support hub for that purpose,
      at least three plunger and spring assemblies, each assembly mounted in one of a set of at least three equally spaced plunger holes in the disk support platter surface said plunger holes for the purpose of accepting the plunger and spring assemblies, said plunger and spring assemblies arranged in the plunger holes such that the springs cause the plungers to be pushed to a fully extended, upward position,
      a flexible spacer ring, having the outside edge of said flexible spacer ring fixed to the inner edge of the disk, said disk having an opening for the attachment of said flexible spacer ring, said flexible spacer ring also having an inner opening for attachment of a disk centering collar, and;
      a disk centering collar, the outer edge of which is fixed to the inner opening in the flexible spacer ring, said disk centering collar also having an interior opening, said interior opening having a taper to allow said flexible spacer ring interior opening to closely fit the tapered outer surface of the spindle neck such that the plunger contacts and causes the flexible spacer ring to flex upward, allowing the disk centering collar to contact the outer tapered surface of the spindle neck prior to the disk contacting the bottom surface of the spindle;
   a first, disk support assembly clamping means, said disk support assembly clamping means selectively clamping the disk support assembly to the disk elevator assembly during disk centering, clamping and unclamping operations, but releasing the disk support assembly to rotate with the disk rotating means during device operation, and;
   a second, disk clamping means, said means selectively clamping the disk between the disk support assembly and the spindle,
   such that, as the disk elevator assembly raises the disk and disk support means toward the spindle where the centering stem contacts the lower rim of the cylindrical passage of the spindle neck, the centering stem and the cylindrical passage cooperating to cause the initial centering of the disk and disk support means with respect to the spindle, and as the disk and disk centering means continues upwards, the inner taper of the centering collar contacts the outer tapered surface on the spindle neck, causing the disk to move laterally for precise centering of the disk with respect to the spindle.

2. The centering and clamping apparatus of claim 1 wherein the first disk support assembly clamping means is comprised of:
   the disk support hub further having an annular gap in its outer surface;
   a plurality of clamping fingers, said clamping fingers having the bottom portion attached to a selective activation means and having the top end disposed in the annular gap for that purpose in the disk support hub, and;
   a selective activation means, said means moving the clamping fingers downward relative to the disk support assembly to securely clamp the disk support assembly to the elevator support assembly during centering, clamping and unclamping, and moving the clamping fingers upward relative to the disk support assembly to release said disk support assembly so as to allow the free rotation of the disk and disk support assembly during device operation.

3. The centering and clamping apparatus of claim 2 wherein the second disk clamping means is comprised of:
   a magnetic ring, said magnetic ring fixed to the upper surface of the disk support platter, located and having a radial thickness such that said magnetic ring is disposed completely under the flexible spacer ring when a disk is generally centered on the disk support platter, and;
   a cylindrically shaped, steel pad, said steel pad mounted to the bottom facing spindle surface and having the same radial thickness as the magnetic ring,
   such that once the disk is precisely centered, the continued upward movement of the disk elevator assembly causes the flexible spacer ring to contact the steel pad, at which time the selective activation means moves the fingers downward releasing the disk support assembly allowing the magnetic ring to pull said disk support assembly upward, clamping the disk to the spindle between the steel pad and the magnetic ring.

4. The centering and clamping apparatus of claim 3 wherein the raised inner support rim and the magnetic ring are combined into a single element.

* * * * *